(12) United States Patent
Nonaka

(10) Patent No.: US 11,077,503 B2
(45) Date of Patent: Aug. 3, 2021

(54) MACHINING METHOD AND MACHINING DEVICE

(71) Applicant: TOYOTA JIDOSHA KABUSHIKI KAISHA, Toyota (JP)

(72) Inventor: Hiroki Nonaka, Nisshin (JP)

(73) Assignee: TOYOTA JIDOSHA KABUSHI KIKAISHA, Toyota (JP)

( * ) Notice: Subject to any disclaimer, the term of this patent is extended or adjusted under 35 U.S.C. 154(b) by 0 days.

(21) Appl. No.: 16/208,826

(22) Filed: Dec. 4, 2018

(65) Prior Publication Data

US 2019/0193168 A1    Jun. 27, 2019

(30) Foreign Application Priority Data

Dec. 22, 2017    (JP) .............................. JP2017-245801

(51) Int. Cl.
*B23B 39/26*    (2006.01)
*B23B 41/04*    (2006.01)
(Continued)

(52) U.S. Cl.
CPC .............. *B23B 39/26* (2013.01); *B23B 35/00* (2013.01); *B23B 41/04* (2013.01); *B24B 33/02* (2013.01);
(Continued)

(58) Field of Classification Search
CPC ... Y10T 408/03; Y10T 408/16; Y10T 408/17; Y10T 408/173; Y10T 408/175;
(Continued)

(56) References Cited

U.S. PATENT DOCUMENTS

| 4,708,545 A | * | 11/1987 | Fujii | ..................... B23Q 35/02 |
| | | | | 408/1 R |
| 5,275,517 A | * | 1/1994 | Turnipseed | .......... B23B 39/003 |
| | | | | 144/135.2 |

(Continued)

FOREIGN PATENT DOCUMENTS

| CN | 105392586 A | 3/2016 |
| CN | 107443136 A | 12/2017 |

(Continued)

OTHER PUBLICATIONS

Office Action dated Apr. 27, 2021 issued in corresponding Japanese patent application No. 2017-24801 with English translation.

(Continued)

*Primary Examiner* — Nicole N Ramos
(74) *Attorney, Agent, or Firm* — Oblon, McClelland, Maier & Neustadt, L.L.P.

(57) ABSTRACT

Provided are a machining method and a machining device that can reduce the displacement from a target round shape due to elastic deformation after machining, and can shorten the time required to machine a target round shape in the work. A machining method machines a round hole in a work, and includes: a hole-shape acquisition step of acquiring a shape of a hole of the work; an inverted-shape acquisition step of inverting the shape of the hole acquired at the hole-shape acquisition step relative to a target round shape to acquire an inverted shape; and an inverted-shape machining step of machining the hole in accordance with the inverted shape acquired at the inverted-shape acquisition step.

2 Claims, 6 Drawing Sheets

(51) Int. Cl.
B23B 35/00 (2006.01)
B24B 33/02 (2006.01)

(52) U.S. Cl.
CPC ..... *B23B 2260/102* (2013.01); *B23B 2270/48* (2013.01)

(58) Field of Classification Search
CPC ............... Y10T 408/21; Y10T 408/557; Y10T 408/558; B23B 35/00; B23B 49/00; B23B 2215/04; B23B 2215/242; B23B 2226/27; B23B 2270/48; B23B 41/12; B23B 41/04; B23B 29/03478; B23Q 15/22; B23Q 15/24; B23Q 15/26; B23Q 16/00; B23Q 17/00; B23Q 17/22; B23Q 17/2233; B23Q 17/2266; B23Q 17/2275; B23Q 17/24; B23Q 17/2414; B23Q 17/2419; B23Q 17/2428
See application file for complete search history.

(56) References Cited

U.S. PATENT DOCUMENTS

| | | | | |
|---|---|---|---|---|
| 7,096,555 | B2* | 8/2006 | Tourne | H05K 3/0047 174/260 |
| 7,264,430 | B2* | 9/2007 | Bischof | B23B 5/36 310/90.5 |
| 7,669,321 | B1* | 3/2010 | Levy | H05K 1/0268 174/260 |
| 2006/0219066 | A1* | 10/2006 | Nicholl | F16C 32/0696 82/1.11 |
| 2008/0022818 | A1* | 1/2008 | Hackh | G05B 19/404 82/147 |
| 2010/0197199 | A1* | 8/2010 | Flores | B24B 33/088 451/27 |
| 2011/0023667 | A1* | 2/2011 | Kume | B23B 41/04 82/1.3 |
| 2015/0086285 | A1* | 3/2015 | Norman | B23B 35/00 408/1 R |
| 2016/0167138 | A1* | 6/2016 | Fukumitsu | B23B 41/12 700/160 |
| 2016/0170401 | A1 | 6/2016 | Mori et al. | |
| 2017/0304978 | A1* | 10/2017 | Nonaka | B23B 41/04 |

FOREIGN PATENT DOCUMENTS

| | | | | |
|---|---|---|---|---|
| GB | 2531481 A | * | 4/2016 | ....... B23B 29/03478 |
| JP | 2000-291487 A | | 10/2000 | |
| JP | 2015-31537 | | 2/2015 | |
| JP | 6029761 | | 11/2016 | |
| JP | 2017196728 A | * | 11/2017 | |
| WO | WO-2015016223 A1 | * | 2/2015 | ........... G05B 19/404 |

OTHER PUBLICATIONS

Office Action dated Apr. 27, 2021 issued in corresponding Japanese patent application No. 2017-245801 with English translation.

* cited by examiner

MACHINING METHOD AND MACHINING DEVICE

CROSS REFERENCE TO RELATED APPLICATIONS

The present application claims priority from Japanese patent application JP 2017-245801 filed on Dec. 22, 2017, the content of which is hereby incorporated by reference into this application.

BACKGROUND

Technical Field

The present disclosure relates to a method for machining a round hole in a work and such a machining device.

Background Art

Conventionally inventions about the machining of a round hole in a work while considering the elastic deformation of the work have been known (see JP 6029761 B). JP 6029761 B discloses a device capable of machining of a round hole in a work, and the device has the following structure.

The machining device described in this document includes a machining head that can reciprocate and is rotary-driven. The machining head includes a cylindrical arbor, a cutting tool that can protrude and retract from the outer circumference of the arbor, and a shaft stored in the arbor. The cutting tool is inserted into a through hole at the leading end of the arbor and extending in the direction perpendicular to the axis of rotation of the arbor. The cutting tool is biased toward the shaft by biasing means. The shaft includes a cam that presses the cutting tool in the protruding direction. The angle of the shaft relative to the arbor can change so as to change a part of the cam that comes into contact with the cutting tool, whereby the amount of protrusion of the cutting tool from the outer circumference of the arbor can change. While rotating the arbor and the shaft in synchronization, the phase of the rotation angle of the shaft is advanced or delayed relative to the phase of the rotation angle of the arbor. This can adjust the amount of protrusion of the cutting tool from the outer circumference of the arbor so as to machine a round hole or non-round hole in the work.

This machining device also includes a controller including a machining load data acquisition unit and a machining shape prediction unit. The machining load data acquisition unit acquires machining load data that is a force that presses the work during machining of the work with the cutting tool. The machining shape prediction unit reads, from a machining load deformation amount correspondence table, the amount of elastic deformation corresponding to the machining load data acquired by the machining load data acquisition unit, and adds the amount of elastic deformation to the target shape of the machining to predict the machining shape after the machining. This machining device inverts the machining shape predicted by the machining shape prediction unit with respect to the target round shape and adjusts the amount of protrusion of the cutting tool so that the cutting tool machines such an inverted shape. This can compensate the displacement from the target round shape due to the elastic deformation after machining, and can machine the target round shape in the work.

SUMMARY

The amount of elastic deformation depends on a work, and also depends on a part of the work in contact with the tip of the cutting tool. This means that the machining load deformation amount correspondence table has to specify the relationship between the machining load and the amount of elastic deformation for each part of the circumference that comes in contact with the tip of the cutting tool. To predict the machining shape, the acquired machining load data has to be checked against the deformation amount correspondence table. The machining device described in JP 6029761 B therefore may require time to compensate the displacement from the target round shape due to the elastic deformation after machining and to machine the target round shape in the work.

In view of the above, the present disclosure provides a machining method and a machining device that can reduce the displacement from a target round shape due to the elastic deformation after machining, and can shorten the time required to machine a target round shape in the work.

A machining method according to one aspect of the present disclosure machines a round hole in a work. The method includes: a hole-shape acquisition step of acquiring a shape of a hole of the work; an inverted-shape acquisition step of inverting the shape of the hole acquired at the hole-shape acquisition step relative to a target round shape to acquire an inverted shape; and an inverted-shape machining step of machining the hole in accordance with the inverted shape acquired at the inverted-shape acquisition step.

This machining method includes the inverted-shape machining step of machining the hole in the work in accordance with the inverted shape of the hole that is acquired at the inverted-shape acquisition step relative to the target round shape. This can reduce the displacement from the target round shape due to the elastic deformation after machining without using the machining load deformation amount correspondence table to machine a hole of the target round shape in the work and can shorten the time of machining.

Preferably the hole-shape acquisition step acquires the shape of the hole based on positional information of a machining tool of a machining device that is used at the inverted-shape machining step.

This machining method includes the hole-shape acquisition step that acquires the shape of the hole with the machining tool of the machining device. For the method including rough machining with the machining tool before the inverted-shape machining step, the hole-shape acquisition step and the rough-machining step can be performed at the same time, and so the time of machining can be shortened.

A machining device according to another aspect of the present disclosure machines a hole in a work, and the device includes: a machining tool; a rotary device that rotates the machining tool; a rotation angle sensor that acquires an angle of rotation of the machining tool; a driving unit that moves the machining tool in a direction perpendicular to an axis of rotation of the machining tool; a position sensor that acquires positional information on the machining tool on a plane perpendicular to the axis of rotation of the machining tool; and a controller that includes a driving/control unit that controls the rotary device and controls the driving unit in accordance with the angle of rotation acquired by the rotation angle sensor and the positional information acquired by the position sensor. The controller includes a hole-shape acquisition unit configured to acquire a shape of a hole of a work; and an inverted-shape acquisition unit configured to invert the shape of the hole acquired at the hole-shape acquisition unit relative to a target round shape to acquire an inverted shape, and the driving/control unit controls the driving unit in accordance with the inverted shape acquired by the inverted-shape acquisition unit.

This machining device can control the driving unit in accordance with the inverted shape of the hole shape acquired by the hole-shape acquisition unit relative to the target round shape so as to machine a hole in the work with the machining tool. This can reduce the displacement from the target round shape due to the elastic deformation after machining without using the machining load deformation amount correspondence table to machine a hole of the target round shape in the work and can shorten the time of machining.

Preferably the hole-shape acquisition unit acquires the shape of the hole of the work in accordance with the positional information acquired by the position sensor.

This machining device includes the hole-shape acquisition unit that acquires the shape of the hole with the machining tool. When rough machining is performed with the machining tool before machining based on the inverted shape, the hole-shape acquisition and the rough-machining can be performed at the same time, and so the time of machining can be shortened.

Preferably the machining device includes a rotary tool having one end provided with the machining tool and the other end provided with the rotary device; and a spindle head that supports the rotary tool rotatably, and the driving unit moves the spindle head in a direction perpendicular to an axis of rotation of the machining tool to move the machining tool in the direction perpendicular to the axis of rotation of the machining tool.

This machining device controls the driving unit to control the position of the spindle head in a direction perpendicular to an axis of rotation of the machining tool and then control the position of the machining tool in the direction perpendicular to the axis of rotation of the machining tool. In this way, unlike the machining device as in JP 6029761 B configured to control the angle of the shaft including a cam relative to the rotary tool so as to control the position of the machining tool disposed at the rotary tool in the direction perpendicular to the axis of rotation of the machining tool, the position of the machining tool does not change, which results from a variation in contact force of the cam with the machining tool. The present disclosure therefore can improve the accuracy of machining of a work.

DETAILED DESCRIPTION

Figure 1:
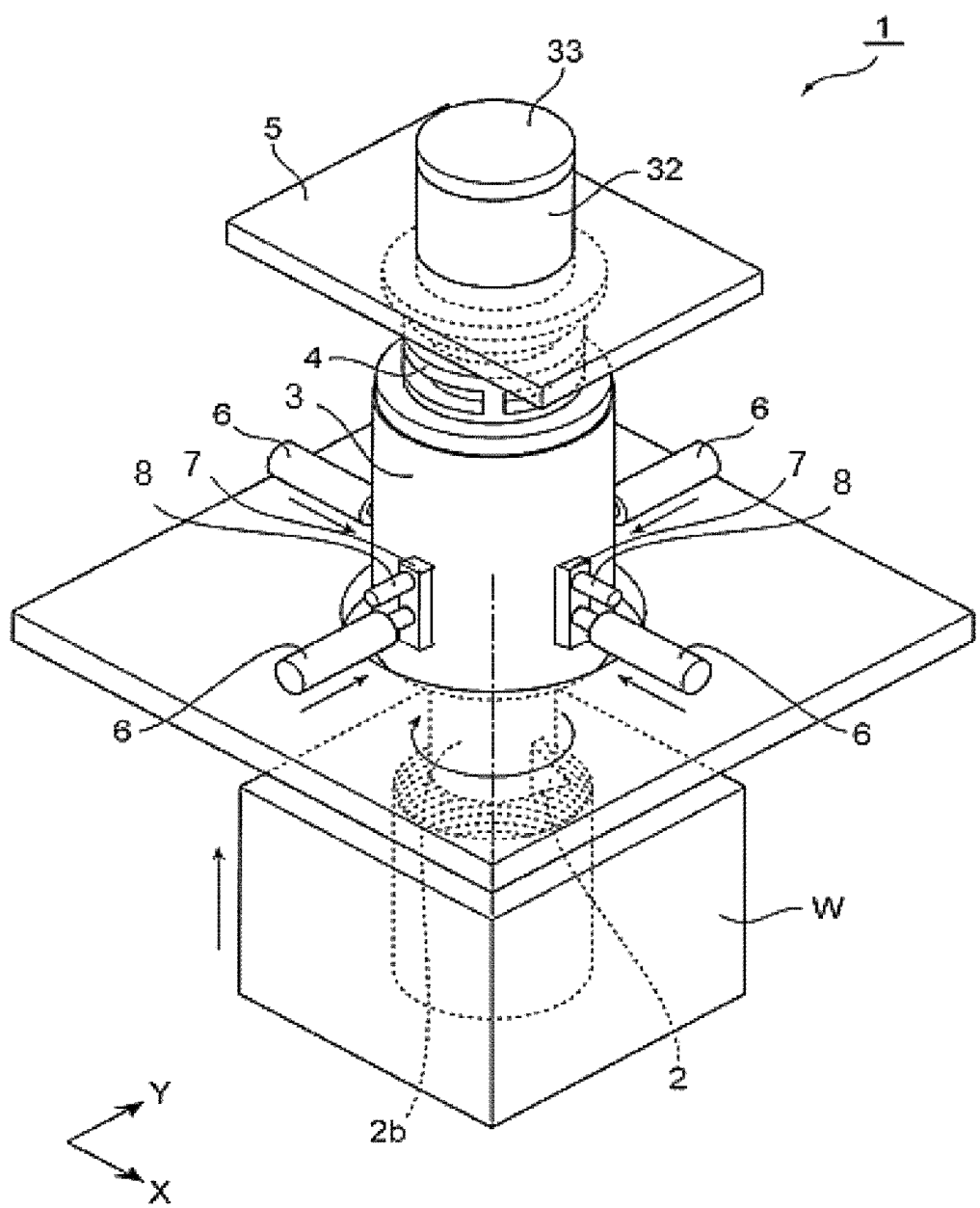
FIG. 1 is a schematic perspective view of a machining device according to one embodiment of the present disclosure.

Referring to the drawings, the following describes a specific embodiment of the present disclosure in details. The present disclosure is not limited to the following embodiment. For illustrative purpose, the following description and drawings may be simplified as needed.

The following describes one embodiment of the machining device according to the present disclosure, with reference to the drawings.

Figure 2:
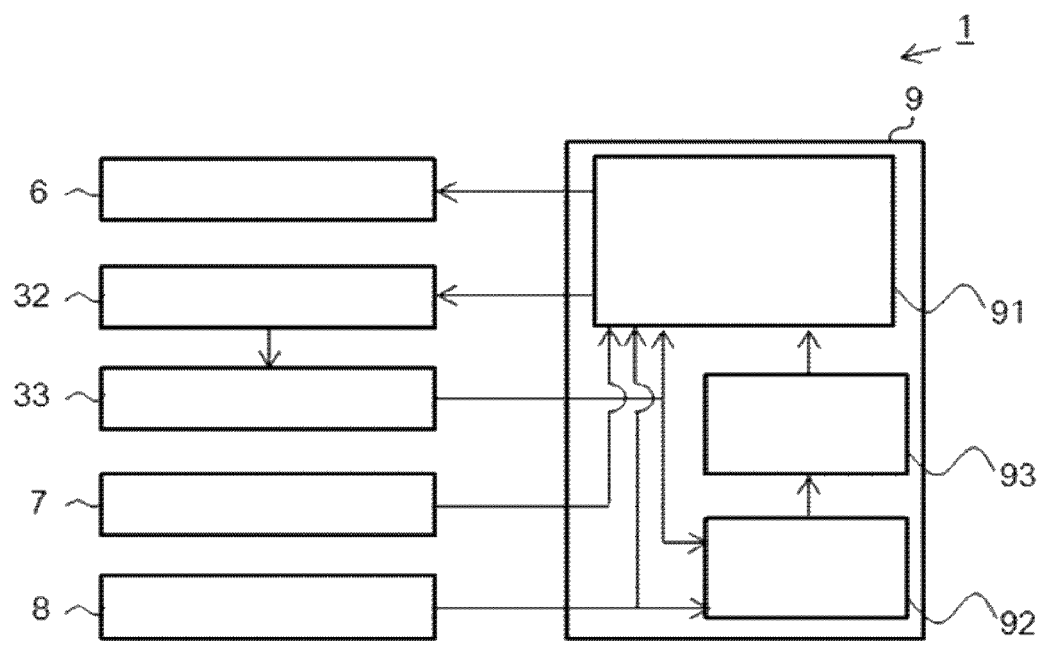
FIG. 2 is a block diagram of the machining device of FIG. 1.

FIG. 1 is a schematic perspective view of a machining device 1 according to one embodiment of the present disclosure. FIG. 2 is a block diagram of the machining device of FIG. 1.

The machining device 1 of the present embodiment includes a machining tool 2, a rotary tool 2b having the machining tool 2 on the outer circumference, a spindle head 3 that supports the rotary tool 2b rotatably, a motor (rotary device) 32 that rotates the rotary tool 2b, driving units 6 to move the machining tool 2 in the direction perpendicular to the axis of rotation of the machining tool 2, load sensors 7 to acquire the load received from the driving units 6, position sensors 8 to acquire the position of the machining tool 2, and a controller 9 to control the motor 32 and control the driving units 6 based on the position of the machining tool 2 acquired by the position sensors 8. With this configuration, the machining device can move the machining tool 2 along the rotating trajectory of the tool that is round or non-round, and so can machine a round or non-round face in a work W as a target.

The machining tool 2 is disposed at one end of the rotary tool 2b. The machining tool 2 includes a cutting tool for boring and a grinding tool for honing. That is, the machining device 1 can operate as a boring machine or a honing machine that performs boring or honing of a bore in a cylinder block as a work W, for example.

The spindle head 3 is fixed to a mounting base 5 via a flexible coupling 4, and is supported by the flexible coupling 4 while hanging from the mounting base 5. The flexible coupling 4 deforms so as to allow the movement of the spindle head 3 in the direction perpendicular to the axial direction of the spindle head. The mounting base 5 supports the motor 32. The spindle head 3 internally includes a not-illustrated bearing fixed thereto, and supports the rotary tool 2b rotatably.

The driving shaft of the motor 32 connects to the other end of the rotary tool 2b on the other side of the end provided with the machining tool 2. Rotation of the driving shaft of the motor 32 rotates the machining tool 2 about the axis R of rotation of the rotary tool 2b. The motor 32 includes an encoder (rotation angle sensor) 33, and the encoder 33 can obtain the angle of rotation of the driving shaft of the motor 32.

The driving units 6 are adjacent to the spindle head 3 in the direction perpendicular to the axis R of rotation of the rotary tool 2b, i.e., the axis R of rotation of the machining tool 2, and are opposed to the spindle head 3. More specifically, four driving units 6 in total are disposed, including one driving unit on each of the both sides of the spindle head 3 on a plane perpendicular to the axis R of rotation of the machining tool 2 and in the directions of X-axis and of Y-axis.

Each of the driving units 6 includes a piezo actuator or a magnetostrictive member. The magnetostrictive member may be made of a monocrystal super-magnetostrictive material containing terbium, dysprosium or iron. Magnetostriction refers to a physical phenomenon where a magnetic material is elastically-deformed due to the influences from the external magnetic field. A magnetostrictive member can generate a large force at a high response speed, which is equivalent to a piezo actuator, and is durable. A super-magnetostrictive material has the magnetostriction of about 2000 ppm, for example, which is about two orders of magnitude grader than that of a conventional magnetostrictive material.

The load sensors 7 are opposed to the driving units 6 and are disposed on the outer circumference of the spindle head 3. More specifically, four load sensors 7 in total are disposed, including one load sensor on each of the both sides of the spindle head 3 on a plane perpendicular to the axis R of rotation of the machining tool 2 and in the directions of X-axis and of Y-axis.

The load sensors 7 can measure the load received from the driving units 6. For instance, each load sensor 7 includes a strain element that deforms in proportion to force, and a gauge fixed to the strain element. When the load is applied to the strain element, the strain element and the gauge deform. The electrical resistance of the gauge changes in proportion to the deformation. The load sensor can measure a variation in the electrical resistance to measure the load.

The position sensors 8 are opposed to the load sensors 7 and are disposed above the driving units 6. More specifically, two position sensors 8 in total are disposed, including one position sensor on one of the both sides of the spindle head 3 on a plane perpendicular to the axis R of rotation of the machining tool 2 and in the directions of X-axis and of Y-axis. The position sensors 8 may be disposed so that the position sensors as a pair are opposed in the X-axis direction and the Y-axis direction, so that the position sensors can detect the actual displacement of the spindle head 3 by removing an increase in dimension due to the thermal expansion.

The position sensors 8 may be a contact or non-contact displacement sensor. The non-contact displacement sensor is not limited especially, and examples of the non-contact displacement sensor include a capacitance sensor, a laser displacement sensor, an ultrasonic displacement sensor, an eddy current displacement sensor, an image sensor, and a strain gauge that the driving unit 6 internally has. Each of the position sensors 8 can measure the distance from the spindle head 3 in the X-axis direction or the Y-axis direction to obtain the measured distance (the position of the spindle head 3 in the XY plane).

The controller 9 may include an arithmetic unit, such as a CPU, a storage device, such as a memory or a hard disk, a program stored in the storage device, and an input/output unit to input/output a signal from/to external devices, such as a sensor. The controller 9 may include a personal computer including an input interface, such as a keyboard, and a display, such as a monitor.

As shown in FIG. 2, the controller 9 includes a driving/control unit 91, a hole-shape acquisition unit 92, and an inverted-shape acquisition unit 93. The driving/control unit 91 connects to the driving units 6, the motor 32, the encoder 33, the load sensors 7, the position sensors 8, and the inverted-shape acquisition unit 93. The hole-shape acquisition unit 92 connects to the encoder 33, the position sensors 8 and the inverted-shape acquisition unit 93. The inverted-shape acquisition unit 93 connects to the hole-shape acquisition unit 92 and the driving/control unit 91.

The hole-shape acquisition unit 92 acquires the angle of rotation of the drive shaft of the motor 32 that is input from the encoder 33. The hole-shape acquisition unit then acquires the angle of rotation of the machining tool 2 based on the relationship between the angle of rotation of the driving shaft of the motor 32 and the angle of rotation of the tip 2a of the machining tool 2, which is stored in advance in the storage device of the controller 9. The hole-shape acquisition unit 92 acquires the position of the spindle head 3 on the XY plane that is input from the position sensors 8. The hole-shape acquisition unit then acquires the position of the tip 2a of the machining tool 2 on the XY plane based on the relationship between the position of the spindle head 3 on the XY plane and the position of the tip 2a of the machining tool 2 on the XY plane, which is stored in advance in the storage device of the controlling unit 9. The hole-shape acquisition unit 92 can acquire the shape of the hole of the work W based on these acquired angle of rotation and position on the XY plane of the tip 2a of the machining tool 2.

The inverted-shape acquisition unit 93 inverts the shape of the hole of the work W that is input from the hole-shape acquisition unit 92 relative to a target machining shape that is input beforehand to acquire the inverted shape by the method described later.

The driving/control unit 91 outputs a control signal to the driving units 6 and the motor 32. This control signal is set based on the information, such as the information on the angle of rotation of the driving shaft of the motor 32 that is input from the encoder 33, the information on the position of the spindle head 3 on the XY plane that is input from the position sensors 8, the information on the load received from the driving units 6 that is input from the load sensors 7, and the information on the inverted shape that is input from the inverted-shape acquisition unit 93.

Figure 3:
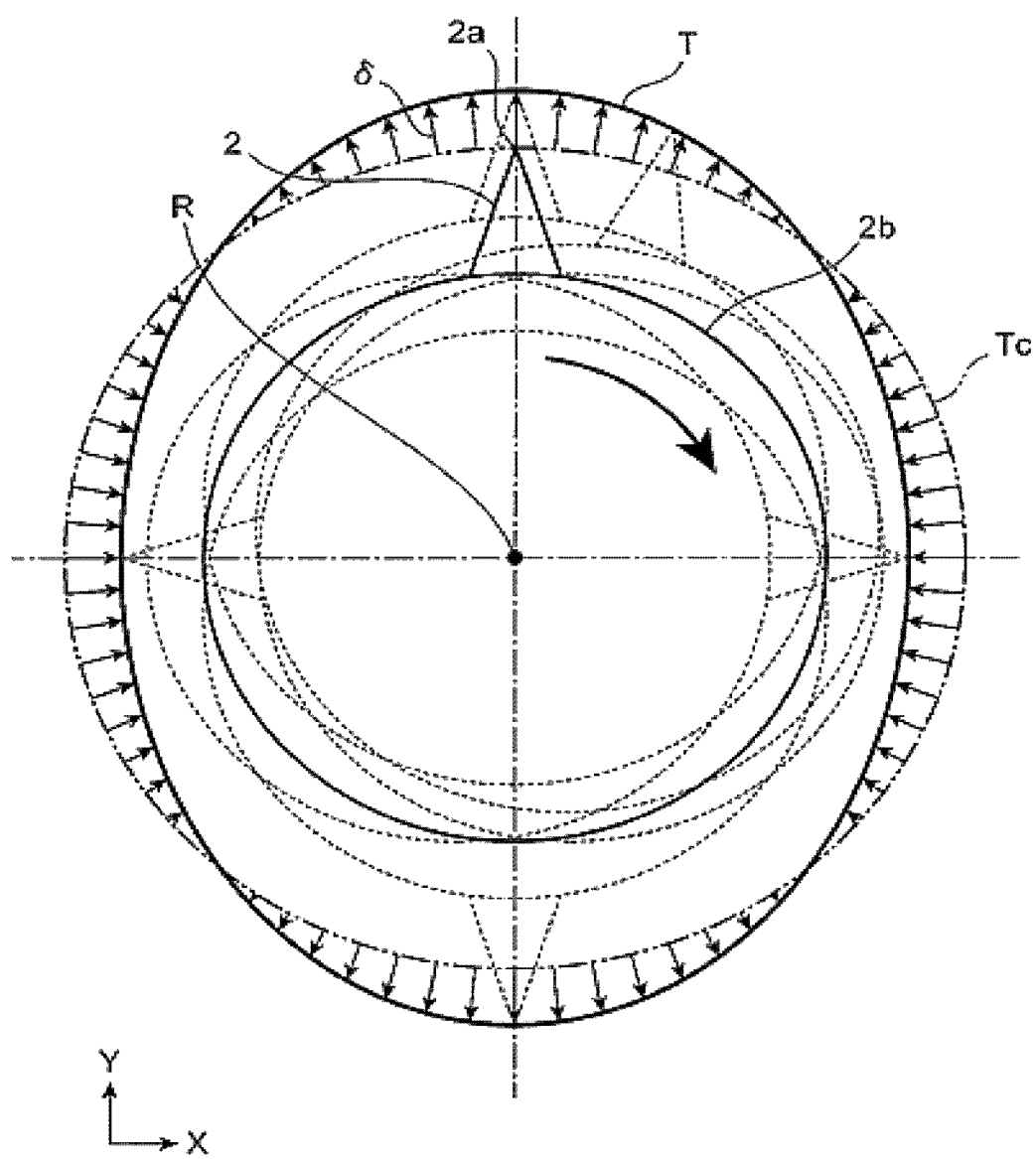
FIG. 3 is a plan view showing one example of the rotating trajectory of the tool of the machining device of FIG. 1.

FIG. 3 is a plan view of one example of the rotating trajectory T of the tool of the machining device 1 shown in FIG. 1. In this illustrated example, the machining tool 2 indicated with the solid line is a cutting tool for boring, for example. The driving units 6 are driven to rotate the machining tool 2 about the axis R of rotation while holding the position of the spindle head 3 on the XY plane, so that the tip 2a as the machining part of the machining tool 2 moves along the round rotating trajectory Tc of the tool indicated with the chain double-dashed line. To shift this round rotating trajectory Tc of the tool to the elliptical or non-round rotating trajectory T of the tool indicated with the solid line, the position of the axis R of rotation of the machining tool 2 on the XY plane has to change in accordance with the angle of rotation of the machining tool 2.

To this end, the storage device of the control unit 9 stores the relationship between the position of the spindle head 3 on the XY plane and the position of the tip 2a of the machining tool 2 on the XY plane, and the relationship between the angle of rotation of the driving shaft of the motor 32 and the angle of rotation of the tip 2a of the machining tool 2, for example. Based on a program stored in the storage device, the controller 9 calculates the relationship between the angle of rotation of the driving shaft of the motor 32 and the position of the spindle head 3 on the XY plane to move the tip 2a of the machining tool 2 along the non-round rotating trajectory T of the tool.

Based on a program stored in the storage device, the driving/control unit 91 then calculates the amounts of extension and contraction of the driving units 6 in accordance with the angle of rotation of the driving shaft of the motor 32 that is input from the encoder 33 so as to satisfy the calculated relationship between the angle of rotation of the driving shaft of the motor 32 and the position of the spindle head 3 on the XY plane. The driving/control unit 91 then outputs a control signal corresponding to the calculated amounts of extension and contraction to the driving units 6.

In this way, the driving/control unit 91 controls the driving units 6 so that the spindle head 3 moves in the direction perpendicular to the axis R of rotation of the machining tool 2 as needed, and so the machining tool 2 moves along the rotating trajectory T. The controller 9 may include a difference circuit to drive the mutually opposed driving units 6 while considering a difference in driving force between the extension and the contraction of the driving units 6 and the hysteresis.

In this way, when rotating the machining tool 2 to machine the work W, the controller 9 controls the driving units 6 to apply an external force to the spindle head 3 so that the rotating trajectory Tc of tool is displaced from the round shape to create a non-round rotating trajectory T of tool and machine the work W to have a non-round hole. That is, the controller 9 drives the driving units 6 so as to satisfy the amount of displacement 6 that is a difference between the round rotating trajectory Tc corresponding to the rotation of the machining tool 2 while fixing the spindle head 3 and the non-round rotating trajectory T of tool as the target, and thus moves the spindle head 3.

Figure 4:
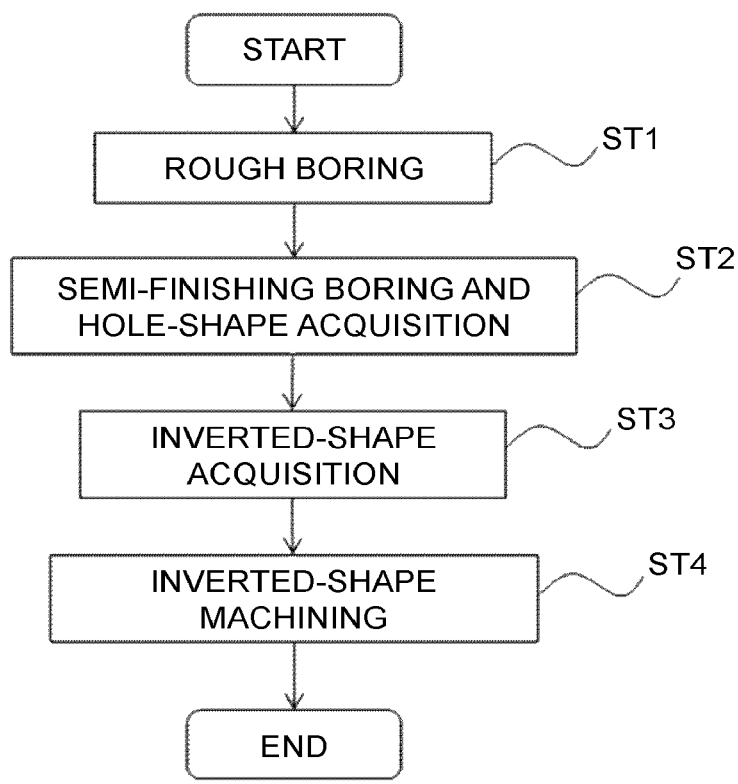
FIG. 4 is a flowchart of the processing by a round-hole machining device according to one embodiment of the present disclosure.
Figure 5A:
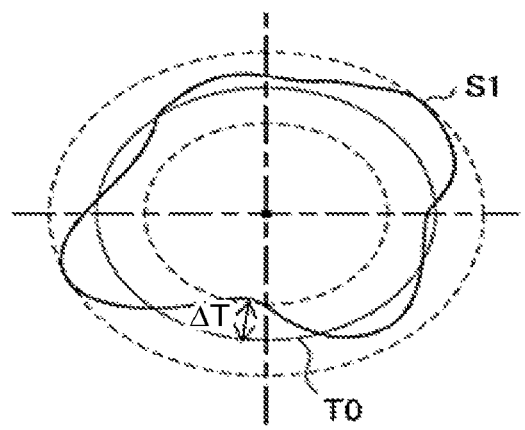
FIG. 5A is a cross-sectional view of the work after springback following Step ST1 in FIG. 4.
Figure 5B:
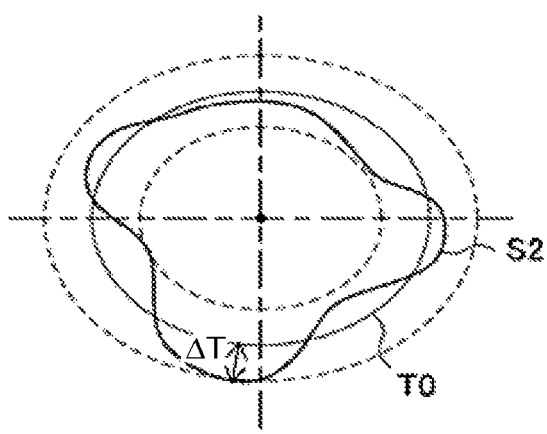
FIG. 5B is a cross-sectional view of the work before springback following Step ST4 in FIG. 4.
Figure 5C:
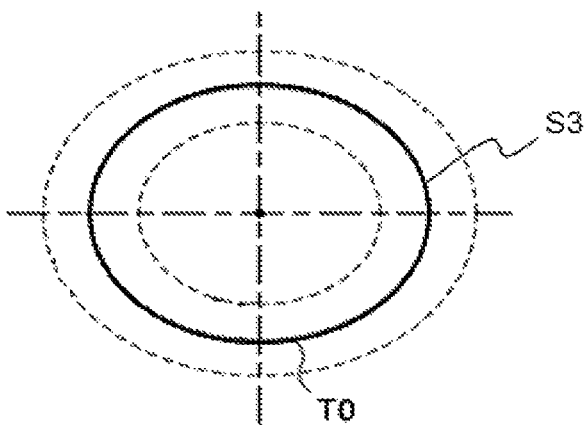
FIG. 5C is a cross-sectional view of the work after springback in FIG. 5B.

The following describes one embodiment of the machining method of the present disclosure, with reference to the drawings. FIG. 4 is a flowchart of the machining method according to one embodiment of the present disclosure. FIGS. 5A to 5C are cross-sectional views of the work before machining by the round-hole machining device according to one embodiment of the present disclosure and after the machining. Specifically FIG. 5A is a cross-sectional view of the work W after springback following Step ST1 of FIG. 4. FIG. 5B is a cross-sectional view of the work W before springback following Step ST4 of FIG. 4. FIG. 5C is a cross-sectional view of the work W after springback following Step ST4 of FIG. 4. In FIGS. 5A to 5C, S1 to S3 show the shapes of holes of the work W, T0 shows a round shape that is a first target machining shape, and ΔT shows a difference between S1 to S3 and T0.

Steps ST1 to ST4 in FIG. 4 are performed by the machining device 1. At rough boring step of Step ST1, the machining device machines a hole in the work W. At the rough boring step of Step ST1, the driving/control unit 91 of the controller 9 controls the motor 32 and the driving units 6 so that the motor 32 and the machining tool 2 rotate about the axis R of rotation while holding the position of the spindle head 3 on the XY plane. This step forms a round hole in the work W.

The work W has various parts of different rigidity, which causes elastic deformation (springback) of a part with low rigidity as shown in S1 of FIG. 5B after the machining at the rough boring step of ST1, so that the machined hole may have a non-round shape.

Then at a semi-finishing boring and hole-shape acquisition step of ST2 in FIG. 4, the machining device machines the work W while acquiring the shape of the machined hole. At this semi-finishing boring and hole-shape acquisition step of Step ST2, the driving/control unit 91 drives the motor 32 and controls to drive the driving units 6 at a constant torque. Specifically the driving/control unit feedback controls the driving units 6 so that a difference between the target torque of the driving units 6 and the actual load received from the driving units 6 that is input from the load sensors 7 becomes close to zero. At this time, the hole-shape acquisition unit 92 acquires the shape of the hole of the work W based on the angle of rotation and position on the XY plane of the tip 2a of the machining tool 2.

At the inverted-shape acquisition step of Step ST3, the inverted-shape acquisition unit 93 inverts the shape of the hole of the work W that is acquired at the semi-finishing boring and hole-shape acquisition step of ST2 relative to the first target machining shape T0 that is input beforehand in the controller 9 to acquire the inverted shape.

As shown in FIG. 5A, the hole shape S1 of the work W acquired at the semi-finishing boring and hole-shape acquisition step of ST2 has a difference ΔT from the target round shape T0 due to springback after the machining. Then the inverted-shape acquisition unit inverts a part of the hole shape S1 in FIG. 5A that is located inside of the reference line T0 by ΔT relative to the reference line T0 to place the part outside of the reference line T0 by ΔT. The inverted-shape acquisition unit then inverts a part of the hole shape S1 that is located outside of the reference line T0 by ΔT relative to the reference line T0 to place the part inside of the reference line T0 by ΔT. In this way, the inverted-shape acquisition unit can acquire the inverted shape as in the hole shape S2 of FIG. 5B.

At the inverted-shape machining step (finishing boring step) of Step ST4, the machining device further machines the hole in the work W. The target machining shape at this inverted-shape machining step is set as the hole shape S2 that is a second target machining shape. The driving/control unit 91 controls the driving units 6 so that the spindle head 3 moves in the direction perpendicular to the axis R of rotation of the machining tool 2 as needed, and so the machining tool 2 moves along the second target machining shape S2.

Through these steps, as shown in FIG. 5C, the hole shape S3 of the work W after springback following the machining at the inverted-shape machining step of Step ST4 can be brought close to a round shape as the first target machining shape T0.

The present disclosure is not limited to the above-stated embodiment, and may be embodied variously as needed without departing from the spirits of the present disclosure. The following (a) to (c) shows the examples.

(a) Instead of the machining device 1 in the above embodiment, any machining device that can perform round and non-round machining, e.g., the machining device described in JP 6029761 B, may be used for machining.

Figure 6:
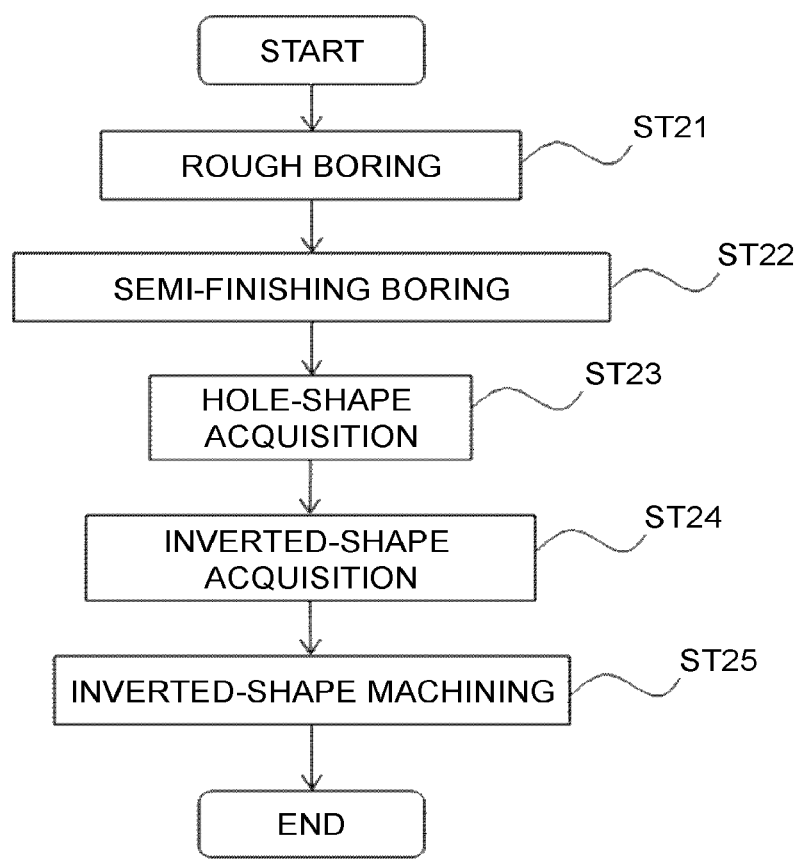
FIG. 6 is a modified example of the flowchart of the processing by a round-hole machining device according to one embodiment of the present disclosure.

(b) In the above embodiment, the semi-finishing boring step and the hole-shape acquisition step are performed at the same time at Step ST2. Instead, as shown in FIG. 6, a semi-finishing boring step at Step ST22 and a hole-shape acquisition step at ST23 may be performed separately.

(c) The above embodiment sets a round shape as the first target machining shape. Instead, a non-round shape, such as an ellipse, may be set.

DESCRIPTION OF SYMBOLS

W Work
ST2, ST23 Hole-shape acquisition step
ST3, ST24 Inverted-shape acquisition step
ST4, ST25 Inverted-shape machining step (finishing boring step)

1 Machining device
2 Machining tool
2b Rotary tool
3 Spindle head
32 Motor (rotary device)
33 Encoder (rotation angle sensor)
6 Driving unit
8 Position sensor
9 Controller
91 Driving/control unit
92 Hole-shape acquisition unit
93 Inverted-shape acquisition unit

What is claimed is:

1. A method of machining a round hole in a work, the method comprising:
   a hole-shape acquisition step of acquiring a shape of a non-round hole of the work, wherein the shape of the non-round hole exhibits a diametrical difference relative to a target round shape at at least one circumferential angular position of the non-round hole;
   an inverted-shape acquisition step of inverting the diametrical difference of the shape of the non-round hole, acquired at the hole-shape acquisition step, to acquire an inverted non-round shape; and
   an inverted-shape machining step of machining the target round shape of the round hole in accordance with the inverted non-round shape acquired at the inverted-shape acquisition step, wherein the inverted-shape machining step is performed using a machining tool, and wherein the hole-shape acquisition step is performed based on positional information of the machining tool on a plane perpendicular to the axis of rotation of the machining tool.

2. A method of machining a round hole in a work, the method comprising:
   a non-round hole machining step applied to a work, to produce a non-round hole of the work by machining a round hole in the work, wherein the shape of the machined round hole changes to a non-round shape due to elastic deformation of the work subsequent to performing the non-round hole machining step;
   a hole-shape acquisition step of acquiring the non-round shape of the non-round hole produced by the non-round hole machining step, wherein the non-round shape exhibits a diametrical difference relative to a target round shape at at least one circumferential angular position of the non-round hole;
   an inverted-shape acquisition step of inverting the diametrical difference of the non-round shape, acquired at the hole-shape acquisition step, to acquire an inverted non-round shape; and
   an inverted-shape machining step of machining the target round shape of the round hole in accordance with the inverted non-round shape acquired at the inverted-shape acquisition step,
   wherein the inverted-shape machining step is performed using a machining tool, and wherein the hole-shape acquisition step is performed based on positional information of the machining tool on a plane perpendicular to the axis of rotation of the machining tool.

* * * * *